United States Patent
Iwaguchi et al.

(10) Patent No.: US 9,632,241 B2
(45) Date of Patent: Apr. 25, 2017

(54) OPTICAL FIBER

(71) Applicant: SUMITOMO ELECTRIC INDUSTRIES, LTD., Osaka-shi, Osaka (JP)

(72) Inventors: Noriaki Iwaguchi, Yokohama (JP); Masuo Iida, Osaka (JP); Kumiko Tachibana, Yokohama (JP); Takashi Fujii, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/758,322

(22) PCT Filed: Nov. 7, 2014

(86) PCT No.: PCT/JP2014/079585
§ 371 (c)(1),
(2) Date: Jun. 29, 2015

(87) PCT Pub. No.: WO2015/068803
PCT Pub. Date: May 14, 2015

(65) Prior Publication Data
US 2016/0306109 A1    Oct. 20, 2016

(30) Foreign Application Priority Data

Nov. 7, 2013    (JP) ................. 2013-231014

(51) Int. Cl.
*G02B 6/036*    (2006.01)
*G02B 6/02*    (2006.01)
(Continued)

(52) U.S. Cl.
CPC ........ *G02B 6/02395* (2013.01); *C03C 13/045* (2013.01); *C03C 25/1065* (2013.01); *C03C 25/40* (2013.01)

(58) Field of Classification Search
CPC .............. G02B 6/02395; C03C 13/045; C03C 25/1065
See application file for complete search history.

(56) References Cited

U.S. PATENT DOCUMENTS

| | | | |
|---|---|---|---|
| 2003/0077059 A1* | 4/2003 | Chien | C03C 25/106 385/128 |
| 2007/0043205 A1* | 2/2007 | Dias | C08F 283/00 528/373 |

(Continued)

FOREIGN PATENT DOCUMENTS

| | | |
|---|---|---|
| JP | H08-194139 A | 7/1996 |
| JP | 2003-095706 A | 4/2003 |

(Continued)

*Primary Examiner* — Sung Pak
(74) *Attorney, Agent, or Firm* — Drinker Biddle & Reath LLP

(57) ABSTRACT

An optical fiber capable of achieving both of the ZSA property and the rapid curability is provided. The optical fiber includes a glass optical fiber 13, a primary coating layer 16 that coats an outer periphery of the glass optical fiber 13, and a secondary optical fiber 17 that coats an outer periphery of the primary coating layer 16. Young's modulus of the primary coating layer 16 is 1.2 MPa or less and Young's modulus of the secondary coating layer 17 is 800 MPa or more. Sulfur content of the surface of the glass optical fiber 13 is 0.2% by atom or more. Sulfur is not present in the vicinity of the outer periphery of the primary coating layer 16.

2 Claims, 1 Drawing Sheet

(51) Int. Cl.
*C03C 25/10* (2006.01)
*C03C 25/40* (2006.01)
*C03C 13/04* (2006.01)

(56) References Cited

U.S. PATENT DOCUMENTS

2010/0046900 A1 2/2010 Nakajima et al.
2014/0308015 A1* 10/2014 Bookbinder ......... G02B 6/0283
385/124

FOREIGN PATENT DOCUMENTS

| | | |
|---|---|---|
| JP | A-2007-334111 | 12/2007 |
| JP | 2011-033931 A | 2/2011 |
| JP | A-2013-082576 | 5/2013 |
| WO | WO-2008/018155 A1 | 2/2008 |

\* cited by examiner

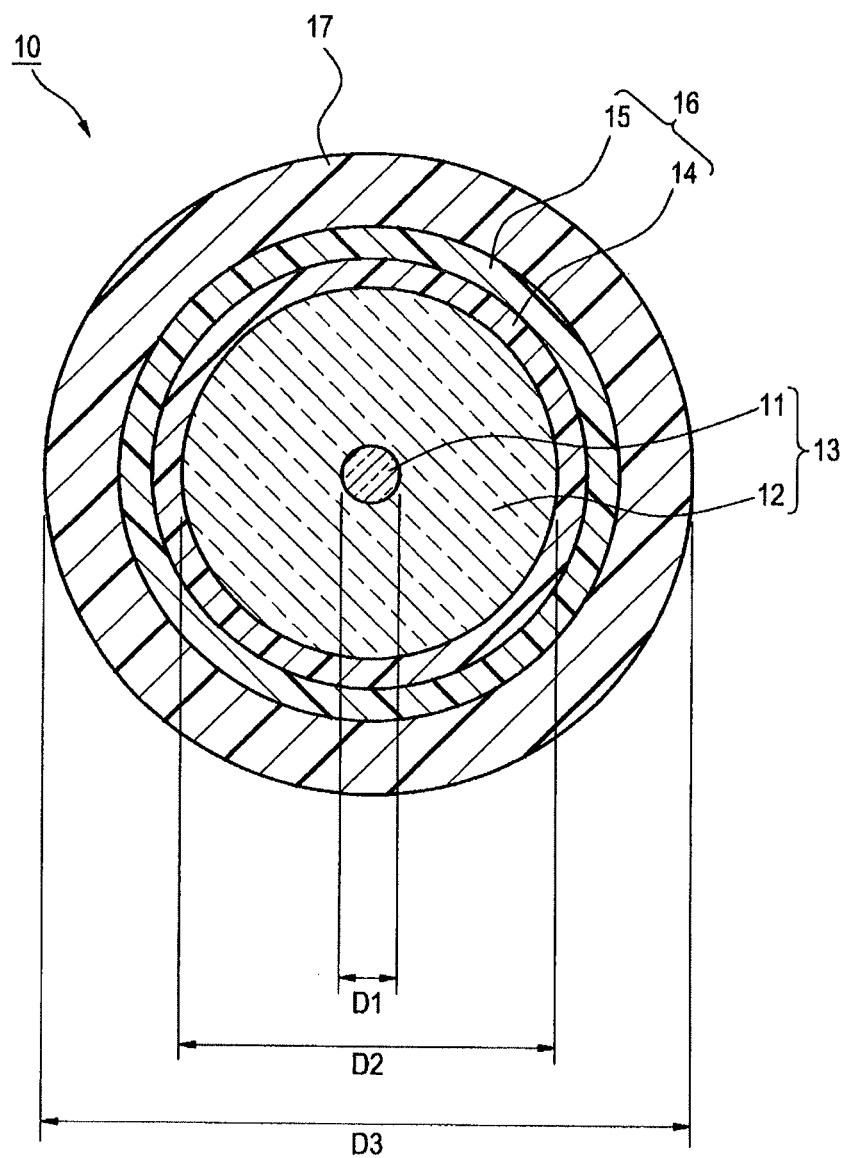

OPTICAL FIBER

TECHNICAL FIELD

The present invention relates to an optical fiber having a primary coating layer and a secondary coating layer provided on the outer periphery of a glass optical fiber.

BACKGROUND ART

Patent Document 1 describes a coated optical fiber having a protective coating layer obtained by curing a UV curable resin composition containing a silane coupling agent on the outer periphery of a glass optical fiber. Moreover, Patent Document 2 describes an optical fiber having a primary coating layer and a secondary coating layer and using a silane coupling agent having a mercapto group as a silane coupling agent that is contained in a photo curable resin composition to be used for forming the primary coating layer.

PRIOR ART DOCUMENTS

Patent Documents

Patent Document 1: JP-A-2011-33931
Patent Document 2: JP-A-2003-95706

SUMMARY OF THE INVENTION

Problems that the Invention is to Solve

However, by the techniques described in Patent Documents 1 and 2, it has been impossible to achieve both of a zero stress aging (Zero Stress Aging; ZSA) property of the optical fiber and rapid curability.

An object of the present invention is to provide an optical fiber capable of achieving both of the ZSA property and the rapid curability.

Means for Solving the Problems (1) An optical fiber according to a first invention comprises:
  a glass optical fiber;
  a primary coating layer that coats an outer periphery of the glass optical fiber; and
  a secondary optical fiber that coats an outer periphery of the primary coating layer, wherein
  Young's modulus of the primary coating layer is 1.2 MPa or less and Young's modulus of the secondary coating layer is 800 MPa or more,
  sulfur content of the surface of the glass optical fiber is 0.2% by atom or more, and
  sulfur is not present in the vicinity of the outer periphery of the primary coating layer.

Effect of the Invention

According to the present invention, it is possible to provide an optical fiber capable of achieving both of the ZSA property and the rapid curability.

BRIEF DESCRIPTION OF THE DRAWINGS

FIG. 1 is a schematic cross-sectional view showing one example of the optical fiber of the invention.

DETAILED DESCRIPTION

[Explanation of Embodiments of the Present Invention]
(1) An optical fiber according to one embodiment of the invention is an optical fiber comprising:
  a glass optical fiber;
  a primary coating layer that coats an outer periphery of the glass optical fiber; and
  a secondary optical fiber that coats an outer periphery of the primary coating layer, wherein
  Young's modulus of the primary coating layer is 1.2 MPa or less and Young's modulus of the secondary coating layer is 800 MPa or more,
  sulfur content of the surface of the glass optical fiber is 0.2% by atom or more, and
  sulfur is not present in the vicinity of the outer periphery of the primary coating layer.

According to the embodiment of the invention, it is possible to achieve both of the ZSA property and the rapid curability.

(2) As the primary coating layer, for example, a coating layer having an inner layer that coats the outer periphery of the glass optical fiber and an outer layer that coats an outer periphery of the inner layer, a resin composition composing the inner layer (which is hereinafter referred as a resin composition for the inner layer) contains a silane coupling agent having a mercapto group, and a resin composition composing the outer layer (which is hereinafter referred as a resin composition for the outer layer) contains no silane coupling agent can be used.

When the silane coupling agent having a mercapto group is used as a silane coupling agent to be contained in the resin composition composing the primary coating layer and the silane coupling agent is allowed to be present at the interface between the glass optical fiber and the primary coating layer, an optical fiber excellent in the ZSA property can be formed.

Thereby, the silane coupling reaction between the silane coupling agent and the surface of the glass optical fiber is prone to occur than before and an excellent ZSA property is achieved. Moreover, at the outer portion of the primary coating layer, since the silane coupling agent having a mercapto group is not present, it seems that the primary coating layer can be rapidly cured without inhibiting elongation of the molecular chain.

(3) It is preferable that the sulfur content of the surface of the glass optical fiber is 0.3% by atom or more.

(4) Further, it is preferable that content of the silane coupling agent having a mercapto group in the resin composition composing the inner layer is 0.5% by mass or more.

(5) Further, it is preferable that unreacted ingredient(s) extracted after immersion in methyl ethyl ketone (MEK) at 60° C. for 17 hours is less than 15%.

With the sulfur content of the surface of the glass optical fiber being 0.3% by atom or more, the content of the silane coupling agent having a mercapto group in the resin composition composing the inner layer being 0.5% by mass or more, or the unreacted ingredient(s) extracted after immersion in methyl ethyl ketone (MEK) at 60° C. for 17 hours being less than 15%, it is possible to obtain the better ZSA property.

[Details of Embodiments of the Invention]
The following will describe embodiments of the invention in detail with reference to FIG. 1.
(Summary of Optical Fiber)
FIG. 1 is a schematic cross-sectional view showing one example of the optical fiber that is one embodiment of the invention.

An optical fiber 10 has a resin coating layer including a primary coating layer 16 and a secondary coating layer 17, which are formed of UV curable resin compositions (hereinafter also simply referred to as "resin compositions"), on the outer periphery of a glass optical fiber 13. The glass optical fiber 13 is composed of a core portion 11 and a cladding portion 12. For example, germanium-added silica can be used for the core portion 11 and pure silica or fluorine-added silica can be used for the cladding portion 12.

In FIG. 1, for example, the diameter (D2) of the glass optical fiber 13 is about 125 μm. Also, the diameter (D1) of the core portion 11 is preferably about from 7 to 15 μm. The resin coating layer is composed of two layers of the primary coating layer 16 and the secondary coating layer 17, and the thickness of the primary coating layer 16 is from 20 to 40 μm and the thickness of the secondary coating layer 17 is from 20 to 50 μm.

In FIG. 1, the primary coating layer 16 has an inner layer 14 and an outer layer 15. The inner layer 14 is formed using the resin composition containing the silane coupling agent having a mercapto group and the outer layer 15 is formed using the resin composition containing no silane coupling agent.

The resin composition for the inner layer is applied to the glass optical fiber 13 and the temperature immediately after irradiation with a UV ray is preferably controlled to 80° C. or higher for curing the composition. By controlling the temperature to 80° C. or higher, the silane coupling reaction between the silane coupling agent and the surface of the glass optical fiber 13 is ensured.

Owing to the above layer configuration and temperature control, the sulfur content of the surface of the glass optical fiber 13 becomes 0.2% by atom or more and sulfur is absent in the vicinity of the outer periphery of the primary coating layer 16.

An upper limit of the sulfur content of the surface of the glass optical fiber 13 is not particularly limited but is preferably 0.5% by atom or less. When the content exceeds 0.5% by atom, the curability of the inner layer 14 sometimes decreases.

The sulfur content of the surface of the glass optical fiber 13 can be, for example, measured by X-ray photoelectron spectroscopy (ESCA) or the like.

In FIG. 1, for example, the thickness of the inner layer 14 is from 5 to 15 μm and the thickness of the outer layer 15 is from 15 to 25 μm.

The Young's modulus of the primary coating layer 16 is not particularly limited as long as it is 1.2 MPa or less but it is preferably from 0.08 to 1.2 MPa, more preferably from 0.1 to 1.0 MPa, and further preferably from 0.3 to 0.8 MPa.

Moreover, the Young's modulus of the secondary coating layer 17 is not particularly limited as long as it is 800 MPa or more but it is preferably from 800 to 1800 MPa, more preferably from 1000 to 1600 MPa, and further preferably from 1200 to 1500 MPa.

Incidentally, the Young's modulus of the above resin coating layer is measured by the following methods.

Young's modulus of primary coating layer 16: it is measured by the Pullout Modulus test at 23° C. Specifically, a cut is made in the resin coating layer 16 of the optical fiber 10 with a razor or the like to cut the resin coating layer 16 and the glass optical fiber 13 is pulled out with fixing the resin coating layers (primary coating layer 16 and secondary coating layer 17). The stress of the primary coating layer 16 is determined from the amount of elastic deformation of the primary coating layer 16 before the glass optical fiber 13 is pulled out and the force with which the glass optical fiber 13 is pulled.

Young's modulus of secondary coating layer 17: A sample (50 mm or more) obtained by pulling the primary coating layer 16 and the secondary coating layer 17 together out of the glass optical fiber 13 with immersion in a solvent (ethanol:acetone=3:7) is subjected to a tensile test (marked line: 25 mm) and the Young's modulus is determined form a 2.5% secant modulus.

(Silane Coupling Agent Having Mercapto Group)

The resin composition for use in the formation of the inner layer 14 contains a silane coupling agent containing a mercapto group. The silane coupling agent containing a mercapto group is not particularly limited but includes γ-mercaptopropyltrimethoxysilane, γ-mercaptopropyltriethoxysilane, γ-mercaptopropylmethyldimethoxysilane, and the like. Of these, γ-mercaptopropyltrimethoxysilane is preferred.

The content of the silane coupling agent containing a mercapto group in the resin composition for the inner layer is not particularly limited but is preferably 0.5% by mass or more, and more preferably from 0.5 to 3.0% by mass.

(Base Resin)

In the present embodiment, the resin compositions forming the above resin coating layers contain the following base resin.

The base resin is not particularly limited as long as it has UV curability. For example, those containing an oligomer, a monomer, and a photoinitiator are preferred.

As the oligomer, there may be mentioned urethane acrylates, epoxy acrylates, or mixed systems thereof.

As the urethane acrylates, there may be mentioned those obtained by reacting a polyol compound, a polyisocyanate compound, and a hydroxyl group-containing acrylate compound.

As the polyol compound, there may be mentioned polytetramethylene glycol, polypropylene glycol, bisphenol A/ethylene oxide added diol, and the like. As the polyisocyanate compound, there may be mentioned 2,4-tolylene diisocyanate, 2,6-tolylene diisocyanate, isophorone diisocyanate, and the like. As the hydroxyl group-containing acrylate compound, there may be mentioned 2-hydroxy acrylate, 2-hydroxyethyl acrylate, 2-hydroxybutyl acrylate, 1,6-hexanediol monoacrylate, pentaerythritol triacrylate, 2-hydroxypropyl acrylate, tripropylene glycol diacrylate, and the like.

Incidentally, as the oligomer contained in the resin composition for forming the secondary coating layer 17, the urethane acrylates are preferred.

As the monomer, there may be mentioned N-vinyl monomers having a cyclic structure, for example, N-vinylpyrrolidone, N-vinylcaprolactam, and acryloylmorpholine. When these monomers are incorporated, a curing rate is improved, so that the case is preferred. In addition thereto, there may be used monofunctional monomers such as isobornyl acrylate, tricyclodecanyl acrylate, benzyl acrylate, dicyclopentanyl acrylate, 2-hydroxyethyl acrylate, phenoxyethyl acrylate, nonylphenyl acrylate, and polypropylene glycol monoacryalte and polyfunctional monomers such as polyethylene glycol diacrylate, tricyclodecanediyldimethylene diacrylate, and bisphenol A/ethylene oxide added diol diacrylate.

As the photoinitiator, there may be mentioned 1-hydroxycyclohexyl phenyl ketone, 2,2-dimethoxy-2-phenylacetophenone, 1-(4-isopropylphenyl)-2-hydroxy-2-methylpropan-1-one, 2,4,4-trimethylpentylphosphine oxide, 2,4,4- trimethylbenzoyldiphenylphosphine oxide, 2-methyl-1-[4-(methylthio)phenyl]-2-morpholino-propan-1-one (IRGACURE 907, manufactured by Ciba Specialty Chemicals), 2,4,6-trimethylbenzoyldiphenylphosphine oxide (LUCIRIN TPO, manufactured by BASF), and the like.

Furthermore, an antioxidant, a photosensitizer, and the like may be also added.

Incidentally, in order to obtain an optical fiber excellent in the ZSA property, as the silane coupling agent to be contained in the resin composition composing the primary coating layer, one having a mercapto group is sometimes used.

However, the silane coupling agent having a mercapto group causes chain transfer at the time of photopolymerization to inhibit the elongation of the molecular chain. As a result, the length of the molecular chain of the resulting polymer decreases to lower the properties of the resin and/or the formation of the coating layer by the curing of the resin composition takes time in some cases.

In the present embodiment, the sulfur content of the surface of the glass optical fiber 13 is 0.2% by atom or more and sulfur is not present in the vicinity of the outer periphery of the primary coating layer 16; specifically, the primary coating layer 16 has the inner layer 14 and the outer layer 15 and the resin composition for the inner layer contains the silane coupling agent having a mercapto group and the resin composition for the outer layer contains no silane coupling agent. By the configuration, in the thickness direction of the primary coating layer 16, the resin compositions are applied so that the concentration of the silane coupling agent has such a concentration gradient that the concentration increases on the glass optical fiber 13 side and it decreases on the secondary coating layer 17 side. Thereby, the silane coupling reaction between the silane coupling agent and the surface of the glass optical fiber is prone to occur than before, the ZSA property becomes excellent, and in the outer portion of the primary coating layer, it is surmised that the primary coating layer can be rapidly cured without inhibiting the elongation of the molecular chain owing to the absence of the silane coupling agent having a mercapto group.

EXAMPLES

The following will show results of evaluation tests using Examples according to the present invention and Comparative Examples and will describe the invention in further detail. Incidentally, the invention should not be construed as being limited to these Examples.

[Manufacture of Optical Fiber 10]

As a glass optical fiber 13, there was used one drawn at a line speed of 2000 m/min and having a core diameter (D1) of 8 μm and a cladding surface diameter (D2) of 125 μm, which contained silica as a main ingredient (relative refractive index difference Δn is 1.0%). Then, on a drawing line, the outer periphery of the glass optical fiber 13 was coated with two layers (an inner layer 14 and an outer layer 15) by curing a resin composition for the inner layer and a resin composition for the outer layer, respectively, each composition having the composition shown below, thereby forming a primary coating layer 16. On the outer periphery thereof, a secondary coating layer 17 is further formed by curing a resin composition for the secondary coating layer, the composition having the composition shown below, thereby manufacturing the optical fiber 10. The thickness of each layer of the inner layer 14, the outer layer 15, and the secondary coating layer 17 was controlled as described in the following Table 1.

Incidentally, the temperature immediately after the resin composition for the inner layer was applied to the glass optical fiber 13 and was irradiated with a UV ray for curing the composition was 80° C. or higher.

(Resin Composition for Inner Layer and Resin Composition for Outer Layer)

γ-Mercaptopropyltrimethoxysilane (silane coupling agent, SC agent) was incorporated in a content (% by mass) shown in the following Table 1 into the following base resin for the primary coating layer.

TABLE 1

(Base Resin for Primary Coating Layer)

| | |
|---|---|
| A urethane acrylate obtained by reacting polypropylene glycol diol with a diisocyanate and a hydroxy acrylate | 65 parts by mass |
| Nonylphenyl acrylate | 26 parts by mass |
| N-vinylcaprolactam | 7.5 parts by mass |
| 2,4,4-Trimethylbenzoyldiphenylphosphine oxide (photoinitiator) | 2.5 parts by mass |

TABLE 2

(Base Resin for Secondary Coating Layer)

| | |
|---|---|
| A urethane acrylate obtained by reacting polypropylene glycol diol with a diisocyanate and a hydroxy acrylate | 50 parts by mass |
| Epoxy acrylate | 20 parts by mass |
| Isobornyl acrylate | 10 parts by mass |
| N-vinylpyrrolidone | 5 parts by mass |
| Ethoxylated nonylphenyl acrylate | 15 parts by mass |
| 2,4,4-Trimethylbenzoyldiphenylphosphine oxide (photoinitiator) | 2 parts by mass |

[Evaluation of Optical Fiber 10]

For the manufactured optical fiber, the following evaluation tests (sulfur content of the surface of the glass optical fiber, ZSA property, and rapid curability) were performed. Results are shown in the following Table 1.

(Sulfur Content of Surface of Glass Optical Fiber)

1) Preparation of Sample

An optical fiber was immersed in acetone, the coating was stripped, and the glass optical fiber after stripping of the coating was wiped once with a paper towel impregnated with acetone and then cut into a length of 1 to 2 cm. Four or five pieces of the cut glass optical fiber were bound and put side by side, and were fixed to a sample table while pushing with a molybdenum plate.

2) Evaluation Method

The above-described prepared sample was subjected to wide-scanning measurement to perform qualitative analysis. For detected elements and sulfur (S) as an aimed element, narrow-scanning measurement was performed and the elemental ratio (% by atom) of sulfur was calculated. Incidentally, averaged surface information obtained from several pieces of cylindrical glass was acquired for each sample.

3) Apparatus and Measurement Conditions ESCA:

Apparatus: Quatera SXM manufactured by ULVAC-PHI, Inc.

X Ray source: monochrome AlKα

X Ray setting: 100 μmφ [15 kV, 25 W]

Photoelectron extraction angle: 45° against a sample surface

Charge neutralization conditions: combined use of an electron neutralization gun and an Ar ion gun Shift correction: A peak attributable to C—C bond was corrected to 285 eV only at the time of C1s spectrum analysis.

(ZSA Property)

An optical fiber after still standing under a wet and hot environment (85° C.×85% RH) for 30 days and an optical fiber before still standing under a wet and hot environment were subjected to a tensile test. Relative to the tensile strength of the optical fiber before still standing under a wet and hot environment, one showing a tensile strength retention of 80% or more is taken as A and one showing a tensile strength retention of less than 80% is taken as B.

Incidentally, the phrase "showing a tensile strength retention of 80% or more" means that, when 15 pieces of the optical fiber that is a sample to be tested are used and the values of the tensile strength of the optical fiber after still standing under a wet and hot environment are sorted in the ascending order, the tensile strength of eighth piece of the optical fiber is 80% or more relative to the tensile strength of the optical fiber before still standing under a wet and hot environment.

(Rapid Curability)

An optical fiber drawn at a line speed of 1500 m/min was immersed in methyl ethyl ketone (MEK) at 60° C. for 17 hours to extract unreacted ingredients and the like. One showing a weight retention ratio of 85% or more (unreacted ingredients: less than 15%) was taken as A and one showing a weight retention ratio of less than 85% (unreacted ingredients: 15% or more) was taken as B, as compared with the sample before extraction.

Incidentally, in the following Table 1, Nos. 1 and 2 are Examples and Nos. 3 and 4 are Comparative Examples.

TABLE 3

Table 1

| No. | Content of inner layer SC agent (% by mass) | Content of outer layer SC agent (% by mass) | Thickness of inner layer (μm) | Thickness of outer layer (μm) | Thickness of secondary coating layer (μm) | Sulfur content of surface of glass optical fiber (at %) | ZSA property | Rapid Curability |
|---|---|---|---|---|---|---|---|---|
| 1 | 0.5 | 0 | 15 | 25 | 22.5 | 0.2 | A | A |
| 2 | 3.0 | 0 | 5 | 15 | 42.5 | 0.5 | A | A |
| 3 | 0.5* | | 40* | | 22.5 | 0.2 | A | B |
| 4 | 0.4 | 0 | 15 | 25 | 22.5 | 0.1 | B | A |

*No. 3 in the above Table 1 contains the SC agent over the whole primary coating layer.

In all the optical fibers of Nos. 1 to 4 in the above Table 1, the Young's modulus of the primary coating layer was 1.2 MPa or less and the Young's modulus of the secondary coating layer was 800 MPa or more.

The optical fibers of Nos. 1 and 2 were excellent in both of the ZSA property and the rapid curability.

The optical fiber of No. 3 was excellent in the ZSA property but was inferior in the rapid curability. The optical fiber of No. 3 was poor in curability of the surface (in the vicinity of the outer periphery) of the primary coating layer. The optical fiber of No. 3 had the same concentration of the SC agent in the primary coating layer as that in the inner layer of the optical fiber of No. 1 but the addition range of the SC agent in the thickness direction of the primary coating layer is different. In the optical fiber of No. 1, since the primary coating layer included two layers and the SC agent was not added to the outer layer, the curability of the outer layer was good.

In the optical fiber of No. 4, since the amount of the silane coupling agent in the inner layer was insufficient, the rapid curability was good but the ZSA property was inferior.

While the invention has been described in detail and with reference to specific embodiments thereof, it will be apparent to one skilled in the art that various changes and modifications can be made therein without departing from the spirit and scope thereof.

The present application is based on Japanese Patent Application No. 2013-231014 filed on Nov. 7, 2013, and the contents are incorporated herein by reference. Also, all the references cited herein are incorporated as a whole.

DESCRIPTION OF REFERENCE NUMERALS AND SIGNS

10: optical fiber
11: core portion
12: cladding portion
13: glass optical fiber
14: inner layer
15: outer layer
16: primary coating layer
17: secondary coating layer

The invention claimed is:

1. An optical fiber comprising:
   a glass optical fiber;
   a primary coating layer that coats an outer periphery of the glass optical fiber; and
   a secondary coating layer that coats an outer periphery of the primary coating layer, wherein
   Young's modulus of the primary coating layer is 0.1 MPa-0.8 MPa and Young's modulus of the secondary coating layer is 800 MPa-1800 MPa,
   sulfur content of the surface of the glass optical fiber which has been exposed after removing the primary coating layer is 0.2%-0.5% by atom,
   sulfur is not present in the vicinity of the outer periphery of the primary coating layer,
   a resin composition comprising the primary coating layer contains nonylphenyl acrylate, N-vinyl-caprolactam and a silane coupling agent having a mercapto group, and
   wherein content of the silane coupling agent in the resin composition is 0.5%-3.0% by mass.

2. The optical fiber according to claim 1, wherein unreacted ingredient(s) extracted after immersion in methyl ethyl ketone (MEK) at 60° C. for 17 hours is less than 15%.

* * * * *